United States Patent [19]
Howey
[11] 3,953,186
[45] Apr. 27, 1976

[54] INDUSTRIAL PROCESS FOR THE PRODUCTION OF GLASS RAZOR BLADES

[76] Inventor: Robert E. Howey, 1217 Kukila St., Honolulu, Hawaii 96818

[22] Filed: Nov. 22, 1974
[21] Appl. No.: 526,375

[52] U.S. Cl. .......... 65/51; 65/56; 65/97; 65/105; 65/148; 225/2; 30/346.53; 30/346.58
[51] Int. Cl.² .......... C03B 21/00
[58] Field of Search .......... 65/31, 51, 56, 97, 105, 65/148, 149, 150; 30/346.53, 346.54, 346.58, 346.6; 225/2

[56] References Cited
UNITED STATES PATENTS

| | | | |
|---|---|---|---|
| 2,378,091 | 5/1945 | McCormick, Jr. | 225/2 |
| 3,607,485 | 9/1971 | Bailey et al. | 65/31 |
| 3,754,884 | 8/1973 | McDavid et al. | 65/97 |

Primary Examiner—Arthur D. Kellogg

[57] ABSTRACT

The industrial process hereinafter described begins with molten glass in which is imbedded a mesh for shatter-resistance, and is then extruded, cooled, and scribed in the size and shape of an injector-style razor blade. The scribed extrusion is inspected for quality control, after which is is broken along the scribed lines. The resulting glass razor blades are again inspected for quality control, after which they are packaged in whatever manner the manufacturer desires.

2 Claims, 3 Drawing Figures

INDUSTRIAL PROCESS FOR THE PRODUCTION OF GLASS RAZOR BLADES

BRIEF SUMMARY OF THE INVENTION

The nature and substance of the invention are that this industrial process would enable any person skilled in the art of glass manufacture or in the manufacture of industrial machines to produce glass razor blades with the two qualities which have heretofore been unobtainable in the state of the art; the qualities of shatter-resistance and sharpness.

BRIEF DESCRIPTION OF THE DRAWINGS

A conceptual illustration of the process is shown in FIG. 1 of the enclosed drawing; which depicts molten glass being extruded, the filament mesh being imbedded in the ribbon, the cooling, scribing, quality control inspection, breaking the ribbon to form the shaving edge, cutting the ribbon into appropriate lengths, another quality control inspection, and final loading and packaging of filled injectors.

A top, or plan, view of the glass ribbon is shown in FIG. 2, after the mesh has been imbedded and the fracture marks scribed.

DETAILED DESCRIPTION

Colored or uncolored molten glass, of an ingredient mixture and temperature to ensure high tensile characteristics is extruded as a ribbon into a machine where a filament mesh is imbedded into the molten ribbon. Rapidly cooled, the filament ribbon is then scribed longitudinally as the ribbon exits this first machine in the process, as illustrated in FIG. 1.

A quality control procedure is the next step in the process, whereby the cooled, scribed glass ribbon is inspected by a device to ensure uniformity of the scribed marks.

Figure 1:
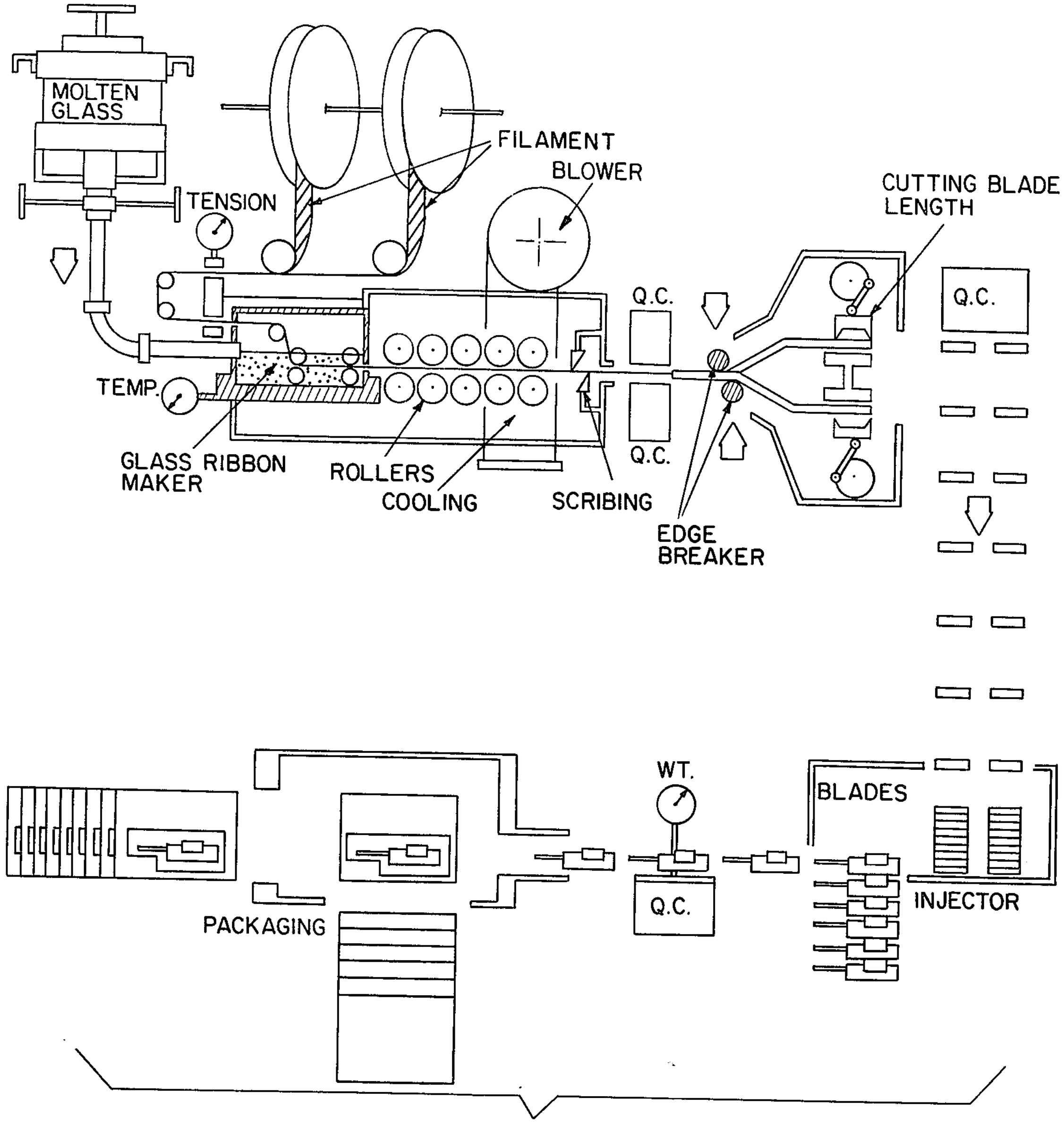
Figure 2:
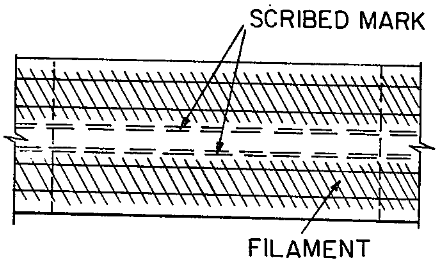
Figure 3:
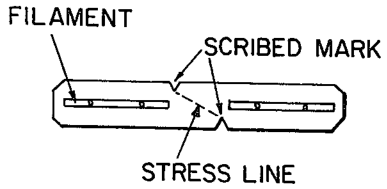
FIG. 3 shows an end, or section, view of the ribbon at the same stage, showing the offset scribe marks.

The next step in the process, as illustrated in FIG. 1, is the fracturing of the glass ribbon, along the longitudinal lines previously scribed, to form the blades's razor edge. This fracturing is accomplished by offset rollers exerting forces on the outside edges of the glass ribbon. The two ribbons thus formed are further cut lengthwise into a dimension equal to injector-style razor blades.

Following the fracturing and sizing of the razor blades, each glass razor blade is quality control inspected for dimension and mesh emplacement.

Following this second quality control inspection the glass razor blades are loaded into injector holders, as illustrated in FIG. 1, the quantity per holder desired by the manufacturer. This loading process, the quality control inspection for weight, and the loaded injector packaging process, illustrated in FIG. 1, are covered by previous patent grants.

I claim:

1. I claim a process for the production of glass razor blades comprising the steps of imbedding mesh into a portion of a layer of molten glass being extruded to form a thin ribbon of glass and in a position within the said ribbon such that other portions of the glass ribbon are free from the mesh, scribing and stress fracturing the ribbon in said other portion of the ribbon, and further cutting the ribbon in dimensions suitable to form glass razor blades.

2. I claim a process which forms a sharp cutting edge on glass by offset scribing across the top and bottom of a glass ribbon on parallel lines with the scribes spaced apart a distance sufficient to yield on breaking an edge having a small acute angle between the broken surface and one of the major surfaces to form a cutting edge, and then exerting sufficient pressure on opposite sides of the scribe lines to stress fracture the glass ribbon between the two scribes lines.

* * * * *